United States Patent
Nojima et al.

(10) Patent No.: US 6,531,106 B1
(45) Date of Patent: Mar. 11, 2003

(54) SELECTIVE REMOVING METHOD OF CARBON MONOXIDE

(75) Inventors: Shigeru Nojima, Hiroshima (JP); Toshinobu Yasutake, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/588,714

(22) Filed: Jun. 7, 2000

(30) Foreign Application Priority Data

Jun. 8, 1999 (JP) .......................................... 11-160614

(51) Int. Cl.[7] .............................................. B01D 53/62
(52) U.S. Cl. .................... 423/247; 423/437.2; 252/373; 502/64; 502/66; 502/78; 502/79; 502/326
(58) Field of Search .......................... 352/373; 423/247, 423/437.2; 502/64, 66, 78, 79, 326

(56) References Cited

U.S. PATENT DOCUMENTS 5,330,727 A * 7/1994 Tocciola et al. ............. 422/177
5,677,254 A * 10/1997 Nojima et al. ................ 502/65

FOREIGN PATENT DOCUMENTS

| EP | 0 642 827 | 3/1995 |
| EP | 0 955 351 | 11/1999 |
| EP | 0976679 A1 * | 2/2000 |
| JP | 6-296870 | 10/1994 |
| WO | WO 93/19005 | 9/1993 |

* cited by examiner

*Primary Examiner*—Stanley S. Silverman
*Assistant Examiner*—Maribel Medina
(74) *Attorney, Agent, or Firm*—Oblon, Spivak, McClelland, Maier & Neustadt, P.C.

(57) ABSTRACT

According to the present invention, provided is a method of selectively removing carbon monoxide, comprising the steps of preparing a catalyst bed capable of selectively oxidizing carbon monoxide and including a plurality of catalyst layers arranged in series and the plurality of catalyst layers differing from each other in the temperature of application and arranged in the order of the application temperature such that the catalyst layer having the highest application temperature constitutes the upstream side of the catalyst bed, and introducing a gaseous mixture containing $H_2$, CO and an oxidizing agent of $O_2$ into the catalyst bed through the upstream side of the catalyst bed so as to selectively oxidize and remove CO from the gaseous mixture.

15 Claims, 1 Drawing Sheet

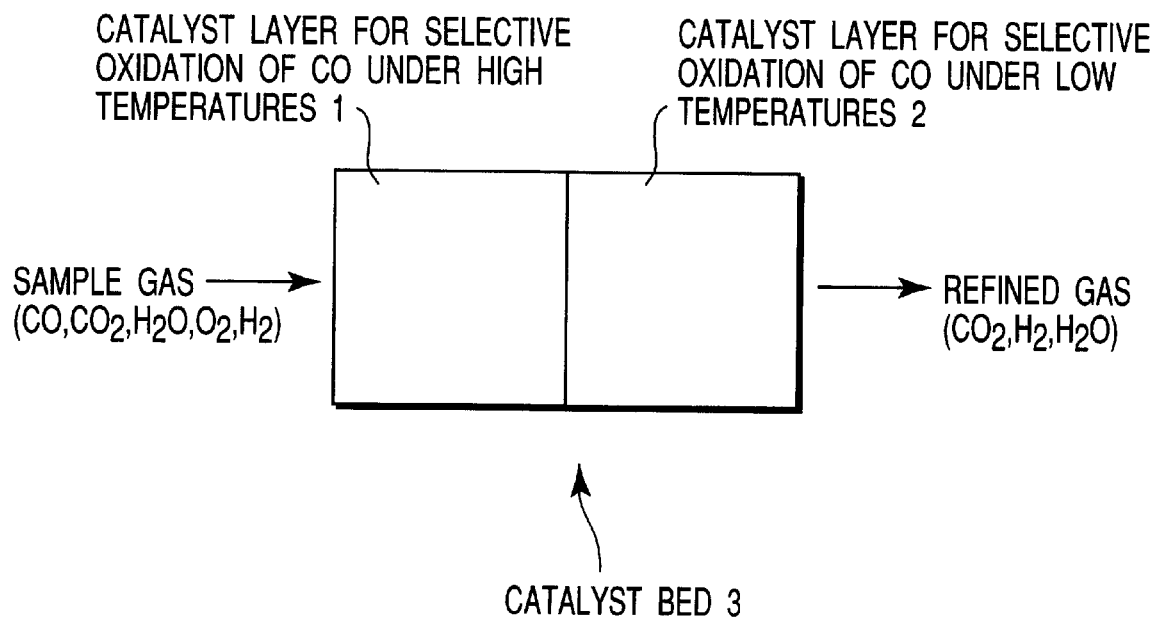
FIGURE

SELECTIVE REMOVING METHOD OF CARBON MONOXIDE

CROSS-REFERENCE TO RELATED APPLICATIONS

This application is based upon and claims the benefit of priority from the prior Japanese Patent Application No. 11-160614, filed Jun. 8, 1999, the entire contents of which are incorporated herein by reference.

BACKGROUND OF THE INVENTION

The present invention relates to a selective removing method of carbon monoxide.

A polymer electrolyte fuel cell permits suppressing generation of a pollutant causing an air pollution, is high in its heat efficiency and, thus, is expected to be used widely as a low temperature operation type fuel cell in a motor car power source, a dispersed power source or the like. A platinum catalyst is used mainly in the electrode of the polymer electrolyte fuel cell. Since the platinum catalyst tends to be poisoned by carbon monoxide (CO), it is necessary remove CO from the fuel gas as much as possible. The fuel gas is manufactured by, for example, reforming the fuel such as methanol by means of steam reforming reaction or a partial oxidation reaction so as to produce a hydrogen gas. Then, CO formed as a by-product in the hydrogen manufacturing reaction is removed by a CO shift reaction of $CO+H_2O \rightarrow CO_2+H_2$.

The removal of CO by the CO shift reaction is limited under the restriction in terms of the chemical equilibrium. For example, where a hydrogen gas is manufactured from methanol, followed by applying the CO shift reaction to the hydrogen-containing reaction mixture, the resultant gaseous composition contains about 40 to 60% of $H_2$, about 10% of $CO_2$, about 20% of $H_2O$, and about 0.5% of CO. It should be noted that, in order to prevent the polymer electrolyte fuel cell from being poisoned by CO, it is necessary to lower the CO concentration to 100 ppm or lower. Such being the situation, it is necessary to take measures for further lowering the CO concentration in combination with the CO shift reaction. As a particular measure, studied is a method in which an oxidizing agent of $O_2$ is added to the gaseous mixture after the CO shift reaction, followed by bringing the resultant gaseous mixture into contact with a catalyst capable of selectively oxidizing carbon monoxide so as to selectively oxidize CO within the gaseous mixture for removing CO. However, the temperature at which the catalyst capable of selectively oxidizing carbon monoxide is allowed to perform its function sufficiently is limited. Therefore, if CO within the gaseous mixture is selectively oxidized in the presence of the catalyst, the carbon monoxide removal rate is fluctuated depending on the temperature of the gaseous mixture.

On the other hand, Japanese Patent Disclosure (Kokai) No. 6-296870 as claimed discloses a catalyst for cleaning the waste gas. It is taught that the catalyst consists of at least one metal selected from the platinum group elements, which is supported on a crystalline silicate having an X-ray diffraction pattern shown in Table A given in this prior art and represented in terms of the molar ratio of the oxide in a dehydrated state by a chemical formula $(1\pm0.8)R_2O \cdot [aM_2O_3 \cdot bM'O \cdot cAl_2O_3] \cdot ySiO_2$, where R denotes an alkali metal ion and/or hydrogen ion, M denotes an ion of at least one element selected from the group consisting of VIII group elements, rare earth elements, Ti, V, Cr, Nb, Sb and Ga, M' denotes an ion of alkaline earth metals of Mg, Ca, Sr, Ba, $0<a$, $0\leq b<20$, $a+c=1$, and $11<y<3000$.

This prior art also teaches in columns [0008] to [0009] that the particular waste gas cleaning catalyst permits cleaning the waste gas containing NOx, CO and HC in accordance with reaction formulas (1) to (4) give below:

$C_3H_6+3/2O_2 \rightarrow 3CH_2O$ (1)

$CH_2O+O_2 \rightarrow CO_2+H_2O$ (2)

$CH_2O+2NO \rightarrow N_2+CO_2+H_2O$ (3)

$CO+1/2O_2 \rightarrow CO_2$ (4)

Reaction (1) given above represents activation of HC, reaction (2) represents combustion of HC, reaction (3) represents a denitrification, and reaction (4) represents combustion of CO.

BRIEF SUMMARY OF THE INVENTION

An object of the present invention is to provide a method of selectively removing carbon monoxide that permits a high carbon monoxide removal rate over a wide temperature range in selectively removing CO from a gaseous mixture containing $H_2$ and CO.

According to a first aspect of the present invention, there is provided a method of selectively removing carbon monoxide, comprising the steps of:

preparing a catalyst bed capable of selectively oxidizing carbon monoxide and including a plurality of catalyst layers arranged in series and the plurality of catalyst layers differing from each other in the temperature of application and arranged in the order of the application temperature such that the catalyst layer having the highest application temperature constitutes the upstream side of the catalyst bed; and introducing a gaseous mixture containing $H_2$, CO and an oxidizing agent of $O_2$ into the catalyst bed through the upstream side of the catalyst bed so as to selectively oxidize and remove CO from the gaseous mixture.

According to a second aspect of the present invention, there is provided a method of selectively removing carbon monoxide, comprising the steps of:

preparing a catalyst bed capable of selectively oxidizing carbon monoxide and including a plurality of catalyst layers arranged in series and the plurality of catalyst layers differing from each other in the temperature of application and arranged in the order of the application temperature such that the catalyst layer having the highest application temperature constitutes the upstream side of the catalyst bed; and introducing a gaseous mixture containing $H_2$, CO and an oxidizing agent of $O_2$ into the catalyst bed through the upstream side of the catalyst bed so as to selectively oxidize and remove CO from the gaseous mixture;

wherein the catalyst in each of the plurality of catalyst layers capable of selectively oxidizing carbon monoxide and differing from each other in the temperature of application includes at least one kind of a carrier and an active metal supported on the carrier, the carrier being selected from the group consisting of Y-type zeolite, mordenite, A-type zeolite, $\gamma$-$Al_2O_3$, anatase and a crystalline silicate having the highest to the fifth highest peaks in the powder X-ray diffraction using CuK$\alpha$ ray in the lattice spacing of $3.65\pm0.1$ Å, $3.75\pm0.1$ Å, $3.85\pm0.1$ Å, $10.0\pm0.3$ Å, and $11.2\pm0.3$ Å, respectively, and having the composition represented by formula (1) under a dehydrated state:

$$(1\pm0.8)R_2O.[aM_2O_3.bNO.cAl_2O_3].ySiO_2 \quad (1)$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are:

$0 \leq a$, $0 \leq b \leq 20$, a+c=1, and $11 \leq y \leq 3000$.

According to a third aspect of the present invention, there is provided a method of selectively removing carbon monoxide, comprising the steps of:

preparing a catalyst bed capable of selectively oxidizing carbon monoxide and including a plurality of catalyst layers arranged in series and the plurality of catalyst layers differing from each other in the temperature of application and arranged in the order of the application temperature such that the catalyst layer having the highest application temperature constitutes the upstream side of the catalyst bed; and introducing a gaseous mixture containing $H_2$, CO and an oxidizing agent of $O_2$ into the catalyst bed through the upstream side of the catalyst bed so as to selectively oxidize and remove CO from the gaseous mixture;

wherein at least one kind of the catalyst includes a carrier and an active metal supported on the carrier, the carrier being a crystalline silicate having the highest to the fifth highest peaks in the powder X-ray diffraction using CuKα ray in the lattice spacing of 3.65±0.1 Å, 3.75±0.1 Å, 3.85±0.1 Å, 10.0±0.3 Å, and 11.2±0.3 Å, respectively, and having the composition represented by formula (1) under a dehydrated state:

$$(1\pm0.8)R_2O.[aM_2O_3.bNO.cAl_2O_3].ySiO_2 \quad (1)$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are:

$0 \leq a$, $0 \leq b \leq 20$, a+c=1, and $11 \leq y \leq 3000$.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

The accompanying FIGURE schematically shows a catalyst bed used in Examples 1 to 23.

DETAILED DESCRIPTION OF THE INVENTION

A method of the present invention for selectively removing carbon monoxide will now be described in detail.

The method of the present invention comprises the step of preparing a catalyst bed capable of selectively oxidizing carbon monoxide and including a plurality of catalyst layers arranged in series and the plurality of catalyst layers differing from each other in the temperature of application and arranged in the order of the application temperature such that the catalyst layer having the highest application temperature constitutes the upstream side of the catalyst bed, and the step of introducing a gaseous mixture containing $H_2$, CO and an oxidizing agent of $O_2$ into the catalyst bed through the upstream side of the catalyst bed so as to selectively oxidize CO and, thus, remove CO from the gaseous mixture.

The oxygen gas ($O_2$) contained in the gaseous mixture is for oxidizing CO and, thus, need not be present together with $H_2$ and CO from the first. The method of the present invention comprises the step of adding an oxidizing agent of $O_2$ to a raw material gaseous mixture containing $H_2$ and CO, followed by introducing the resultant gaseous mixture into the catalyst bed. An oxygen gas or the air can be added to the raw material gaseous mixture.

The catalyst capable of selectively oxidizing carbon monoxide comprises a carrier and at least one kind of an active metal supported on the carrier. The catalyst capable of selectively oxidizing carbon monoxide can be used as it is in the form of a powder or can be held on a porous support.

The carrier used in the present invention is selected from the group consisting of Y-type zeolite, mordenite, A-type zeolite, γ-$Al_2O_3$, anatase-type $TiO_2$ and a crystalline silicate having the highest to the fifth highest peaks in the powder X-ray diffraction using CuKα ray in the lattice spacing of 3.65±0.1 Å, 3.75±0.1 Å, 3.85±0.1 Å, 10.0±0.3 Å, and 11.2±0.3 Å, respectively, and having the composition represented by formula (1) under a dehydrated state:

$$(1\pm0.8)R_2O.[aM_2O_3.bNO.cAl_2O_3].ySiO_2 \quad (1)$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are:

$0 \leq a$, $0 \leq b \leq 20$, a+c=1, and $11 \leq y \leq 3000$.

The same carrier or a plurality of different carriers can be used for preparing a plurality of catalysts capable of selectively oxidizing carbon monoxide and differing from each other in the application temperature.

If the crystalline silicate fails to exhibit peaks at the five lattice spacing in the powder X-ray diffraction using a CuKα ray, or if the peaks, even if exhibited, fail to be any of the highest to the fifth highest peaks, it is impossible to selectively oxidize CO. It is desirable for the crystalline silicate to exhibit the highest to the fifth highest peaks in the powder X-ray diffraction using a CuKα ray at the five lattice spacing and to exhibit the sixth highest peak et seq. at the lattice spacing of 3.0±0.1 Å, 3.3±0.1 Å, 4.25±0.1 Å, 5.6±0.2 Å, 6.0±0.2 Å, and 6.4±0.2 Å. It is more desirable for the crystalline silicate to exhibit the highest to the eleventh highest peaks in the powder X-ray diffraction using a CuKα ray at the eleven lattice spacing and exhibit the twelfth highest peak et seq. at the lattice spacing of 3.05±0.1 Å, 4.6±0.1 Å, 5.7±0.2 Å, and 6.7±0.2 Å.

It is desirable to use the crystalline silicate among the carriers exemplified above.

The active metal supported on the carrier should be at least one kind of metal selected from the group consisting of Pt, Pd, Ru, Rh and Ir.

In selecting a plurality of catalysts differing from each other in the application temperature from among the catalysts capable of selectively oxidizing carbon monoxide, it is desirable to select a catalyst having Pt supported as an active metal on the carrier and another catalyst having at least one active metal selected from Pd, Ru, Rh and Ir supported on the carrier.

It is desirable for the CO concentration in the gaseous mixture containing $H_2$, $O_2$ and CO to be not higher than 4% when the gaseous mixture is introduced into the catalyst bed. If the CO concentration exceeds 4%, the reaction heat tends to be markedly elevated by the combustion heat generated by the combustion reaction of carbon monoxide, with the result that the selectivity of the catalyst capable of selectively oxidizing carbon monoxide tends to be lowered.

It is desirable to control the temperature of the gaseous mixture to fall within a range of between 50° C. and 280° C. when the gaseous mixture is introduced into the catalyst bed. If the temperature of the gaseous mixture is lower than 50° C., the selectivity of the catalyst capable of selectively oxidizing carbon monoxide tends to be markedly lowered. On the other hand, if the temperature of the gaseous mixture exceeds 280° C., the reaction rate of a side reaction of $2H_2+O_2 \rightarrow 2H_2O$ is increased. As a result, the oxidizing reaction of CO tends to be suppressed, resulting in failure to obtain a high CO removal rate.

According to the method of the present invention described above for selectively removing carbon monoxide, a plurality of catalysts capable of selectively oxidizing carbon monoxide and differing from each other in the application temperature are prepared and arranged in series in the order of the application temperature starting with the catalyst having the highest application temperature so as to form a catalyst bed. In the present invention, a gaseous mixture containing $H_2$, CO and an oxidizing agent of $O_2$ is introduced into the catalyst bed through the catalyst layer having the highest application temperature. It should be noted that, where the gaseous mixture has a low temperature, the catalyst having the high application temperature, which is arranged in the upstream stage of the catalyst bed, scarcely performs its catalytic function. Where the gaseous mixture having a low temperature is introduced into the catalyst layer having a low application temperature, which is arranged in the downstream stage of the catalyst bed, the catalyst vigorously performs the catalyst selectivity, thereby carbon monoxide is oxidized selectively. On the other hand, where a gaseous mixture having a high temperature is introduced into the catalyst bed, the catalyst having the high application temperature, which is arranged in the upstream stage, the catalyst vigorously performs the catalyst selectivity, thereby carbon monoxide is oxidized selectively. It follows that the catalysts having different application temperatures vigorously perform their catalytic functions depending on the temperature of the gaseous mixture containing CO and $H_2$, making it possible to process gaseous mixtures having a wide temperature range for selectively removing carbon monoxide with a high removal rate.

In the method of the present invention, it is desirable to use in combination a first catalyst capable of selectively oxidizing carbon monoxide, said first catalyst including a carrier and an active metal of Pt supported on the carrier, and a second catalyst capable of selectively oxidizing carbon monoxide, said second catalyst including a carrier and at least one kind of an active metal selected from Pd, Ru, Rh and Ir, said active metal being supported on the carrier. In this case, the application temperature of the first catalyst capable of selectively oxidizing carbon monoxide is lower than that of the second catalyst capable of selectively oxidizing carbon monoxide. As a result, a high CO removal rate can be achieved under a wide temperature range of the gaseous mixture, e.g., temperature range of between 50° C. and 280° C.

In the present invention, it is particularly desirable to use a crystalline silicate having a composition represented by aforementioned formula (1) under a dehydrated state and having the highest to the fifth highest peaks in the powder X-ray diffraction using CuKα ray in the lattice spacing of 3.65±0.1 Å, 3.75±0.1 Å, 3.85±0.1 Å, 10.0±0.3 Å, and 11.2±0.3 Å, respectively, as a carrier of at least one of the first and second catalysts capable of selectively oxidizing carbon monoxide. In this case, it is possible to improve the carbon monoxide removal rate. The reasons for the improved carbon monoxide removal rate are considered to be as follows.

Specifically, the particular crystalline silicate specified in the present invention is hydrophobic so as to be unlikely to be affected by water that is present together, has a strong charge density distribution, and has fine pores sized about 6 Å and, thus, adapted for the CO adsorption. As a result, the crystalline silicate specified in the present invention is capable of selectively adsorbing a polar substance of CO. It should also be noted that any of Pt, Pd, Ru, Rh and Ir supported on the crystalline silicate exhibits a high activity so as to adsorb $O_2$ contained in the gaseous mixture. As a result, CO adsorbed on the crystalline silicate can be preferentially oxidized by $O_2$ adsorbed on the active metal as denoted by reaction formula (A) given below, though side reactions (a) to (c) also take place to some extent so as to improve the selective oxidizing capability of the catalyst and, thus, to improve the carbon monoxide removal rate:

$2CO+O_2 \rightarrow 2CO_2$                     (A)

$2H_2+O_2 \rightarrow 2H_2O$                (side reaction (a))

$CO_2+H_2 \rightarrow CO+H_2O$            (side reaction (b))

$CO+3H_2 \rightarrow CH_4+H_2O$ (side reaction (c))

The method of the present invention can be used for refining a hydrogen-based fuel gas used in a polymer electrolyte fuel cell.

To be more specific, in order to obtain the fuel gas, a hydrogen gas is manufactured by applying a reforming reaction such as a steam reforming reaction or a partial oxidation reaction to methanol or hydrocarbons such as gasoline or methane. It should be noted that CO formed by a side reaction is contained in the reformed gas. Carbon monoxide contained in the reformed gas is removed in two stages. In the first stage, the CO concentration is lowered to a desired value by, for example, a CO shift reaction. Then, the residual CO is removed by the method of the present invention. To be more specific, the air or an oxygen gas is supplied to the gaseous material having the CO concentration lowered to a desired level. Also, a plurality of catalysts capable of selectively oxidizing carbon monoxide and differing from each other in the application temperature are prepared and arranged in the order of the application temperature such that the catalyst having a high application temperature is arranged in the front stage so as to form a catalyst bed. Then, the gaseous material having the CO concentration lowered to a desired level is introduced into the catalyst bed through the catalyst layer having a high application temperature. Since the catalyst having the application temperature adapted for the temperature of the introduced gas vigorously performs its catalytic function, it is possible to obtain a hydrogen-based fuel gas for a polymer electrolyte fuel cell having CO removed therefrom to a desired level, e.g., not higher than 100 ppm.

Some examples of the present invention will now be described in detail.

In the first step, honeycomb catalysts 1 to 24 used in the Examples of the present invention were prepared as follows.

Honeycomb Catalyst 1:

Water-glass No. 1 ($SiO_2$:30%) was dissolved in an amount of 5,616 g in 5,429 g of water to prepare solution A. On the other hand, dissolved in 4,175 g of water were 18.9 g of aluminum sulfate, 110 g of ferric chloride, 47.2 g of calcium acetate, 262 g of sodium chloride, and 2,020 g of a concentrated hydrochloric acid to prepare solution B. These solutions A and B were supplied at predetermined rates into a container to form precipitation, and the mixture was sufficiently stirred to obtain a slurry having a pH value of 8. The slurry was charged in an amount of 20 liters (L) into an autoclave, followed by introducing 500 g of tetrapropyl ammonium bromide into the autoclave to carry out a hydrothermal synthesis at 160° C. for 72 hours. After the synthesis, the reaction mixture was washed with water and, then, dried, followed by sintering the mixture at 500° C. for 3 hours so as to obtain crystalline silicate 1 having a composition shown in Table 1 under a dehydrated state.

A powder X-ray diffraction measurement using CuKα ray was applied to the resultant crystalline silicate 1 to obtain the lattice spacing (d value) and relative intensities of the highest peak to the 15th highest peak, which are shown in Table 2.

As apparent from Table 2, the crystalline silicate 1 exhibited in the powder X-ray diffraction using a CuKα ray the highest to the fifth highest peaks at the lattice spacing of 3.65±0.1 Å, 3.75±0.1 Å, 3.85±0.1 Å, 10.0±0.3 Å, and 11.2±0.3 Å, respectively, the sixth highest to the eleventh highest peaks at the lattice spacing of 3.0±0.1 Å, 3.3±0.1 Å, 4.25±0.1 Å, 5.6±0.2 Å, 6.0±0.2 Å, and 6.4±0.2 Å, respectively, and the twelfth highest to the fifteenth highest peaks at the lattice spacing of 3.05±0.1 Å, 4.6±0.1 Å, 5.7±0.2 Å, and 6.7±0.2 Å, respectively.

The crystalline silicate 1 was dipped in a 4N $NH_4Cl$ aqueous solution maintained at 40° C. and the solution was kept stirred for 3 hours so as to carry out the $NH_4$ ion exchange. After the ion exchange, the crystalline silicate 1 was washed and, then, dried at 100° C. for 24 hours, followed by sintering the crystalline silicate at 400° C. for 3 hours so as to obtain the H-type crystalline silicate 1.

Then, 100 parts of the H-type crystalline silicate 1 was impregnated with an aqueous solution of chloroplatinic acid ($H_2PtCl_6$) to permit 0.4 part by weight of platinum to be supported by the crystalline silicate 1, followed by evaporating the solvent for the drying purpose and subsequently performing sintering at 500° C. for 5 hours so as to obtain a powdery catalyst.

A binder consisting of 3 parts of alumina sol ($Al_2O_3$:10%) and 55 parts of silica sol ($SiO_2$:20 parts) was added to the resultant powdery catalyst together with 200 parts of water, and the aqueous system was sufficiently stirred to prepare a slurry for wash coating. Then, a monolithic substrate made of cordierite ceramics and having 400 cell lattice meshes was dipped in the slurry. After the substrate was taken out of the slurry, the slurry attached to the substrate was blown off, followed by drying the substrate at 200° C. The coating amount was 150 g per liter of the monolithic substrate, and the coated substrate constituted the honeycomb catalyst 1.

Honeycomb Catalysts 2 to 12:

Crystalline silicates 2 to 12 having the compositions as shown in Table 1 under a dehydrated state were prepared as in preparation of honeycomb catalyst 1 described above, except that cobalt chloride, ruthenium chloride, rhodium chloride, lanthanum chloride, cerium chloride, titanium chloride, vanadium chloride, chromium chloride, antimony chloride, gallium chloride and niobium chloride were added in place of ferric chloride used in preparation of honeycomb catalyst 1 in a molar amount equal to $Fe_2O_3$ in terms of oxides.

A powder X-ray diffraction measurement using a CuKα ray was applied to each of these crystalline silicates 2 to 12, finding that the lattice spacing and the relative intensities of the highest to the fifteenth highest peaks were as shown in Table 2.

Then, honeycomb catalysts 2 to 12 were prepared as in preparation of honeycomb catalyst 1 described above. Honeycomb Catalysts 13 to 15:

Crystalline silicates 13 to 15 having the compositions as shown in Table 1 under a dehydrated state were prepared as in preparation of honeycomb catalyst 1 described above, except that magnesium acetate, strontium acetate and barium acetate were added in place of calcium acetate used in preparation of honeycomb catalyst 1 in a molar amount equal to CaO in terms of oxides.

A powder X-ray diffraction measurement using a CuKα ray was applied to each of these crystalline silicates 13 to 15, finding that the lattice spacing and the relative intensities of the highest to the fifteenth highest peaks were as shown in Table 2.

Then, honeycomb catalysts 13 to 15 were prepared as in preparation of honeycomb catalyst 1 described above.

Honeycomb Catalyst 16:

A carrier consisting of 100 parts of an H-type crystalline silicate 1 equal to that described previously in conjunction with honeycomb catalyst 1 described previously was impregnated with an aqueous solution of palladium chloride to permit 0.4 part by weight of Pd to be supported by the carrier, followed by evaporating the solution and drying the carrier impregnated with palladium and subsequently sintering the carrier at 500° C. for 5 hours so as to obtain powdery catalyst. Further, a honeycomb catalyst 16 was prepared from the powdery catalyst by the method equal to that described previously in conjunction with preparation of honeycomb catalyst 1.

Honeycomb Catalyst 17:

A carrier consisting of 100 parts of an H-type crystalline silicate 1 equal to that described previously in conjunction with honeycomb catalyst 1 described previously was impregnated with an aqueous solution of rhodium chloride to permit 0.4 part by weight of Rh to be supported by the carrier, followed by evaporating the solution and drying the carrier impregnated with rhodium and subsequently sintering the carrier at 500° C. for 5 hours so as to obtain powdery catalyst. Further, a honeycomb catalyst 17 was prepared from the powdery catalyst by the method equal to that described previously in conjunction with preparation of honeycomb catalyst 1.

Honeycomb Catalyst 18:

A carrier consisting of 100 parts of an H-type crystalline silicate 1 equal to that described previously in conjunction with honeycomb catalyst 1 described previously was impregnated with an aqueous solution of ruthenium chloride to permit 0.4 part by weight of Ru to be supported by the carrier, followed by evaporating the solution and drying the carrier impregnated with ruthenium and subsequently sintering the carrier at 500° C. for 5 hours so as to obtain powdery catalyst. Further, a honeycomb catalyst 18 was prepared from the powdery catalyst by the method equal to that described previously in conjunction with preparation of honeycomb catalyst 1.

Honeycomb Catalyst 19:

A carrier consisting of 100 parts of an H-type crystalline silicate 1 equal to that described previously in conjunction with honeycomb catalyst 1 described previously was impregnated with an aqueous solution of iridium chloride to permit 0.4 part by weight of Ir to be supported by the carrier, followed by evaporating the solution and drying the carrier impregnated with rhodium and subsequently sintering the carrier at 500° C. for 5 hours so as to obtain powdery catalyst. Further, a honeycomb catalyst 19 was prepared from the powdery catalyst by the method equal to that described previously in conjunction with preparation of honeycomb catalyst 1.

Honeycomb Catalyst 20:

A powdery catalyst was prepared by impregnating an H-type Y-zeolite powder with an aqueous solution of chloroplatinic acid to permit 0.4 part by weight of Pt to be supported by the zeolite powder. Then, a honeycomb catalyst 20 was prepared by the method similar to that described previously in conjunction with preparation of honeycomb catalyst 1.

Honeycomb Catalyst 21:

A powdery catalyst was prepared by impregnating an H-type mordenite powder with an aqueous solution of chloroplatinic acid to permit 0.4 part by weight of Pt to be supported by the mordenite powder. Then, a honeycomb catalyst 21 was prepared by the method similar to that described previously in conjunction with preparation of honeycomb catalyst 1.

Honeycomb Catalyst 22:

A powdery catalyst was prepared by impregnating an Ca-type A-zeolite powder with an aqueous solution of chloroplatinic acid to permit 0.4 part by weight of Pt to be supported by the zeolite powder. Then, a honeycomb catalyst 22 was prepared by the method similar to that described previously in conjunction with preparation of honeycomb catalyst 1.

Honeycomb Catalyst 23:

A powdery catalyst was prepared by impregnating a $\gamma\text{-}Al_2O_3$ powder with an aqueous solution of chloroplatinic acid to permit 0.4 part by weight of Pt to be supported by the alumina powder. Then, a honeycomb catalyst 23 was prepared by the method similar to that described previously in conjunction with preparation of honeycomb catalyst 1.

Honeycomb Catalyst 24:

A powdery catalyst was prepared by impregnating an anatase-type $TiO_2$ powder with an aqueous solution of chloroplatinic acid to permit 0.4 part by weight of Pt to be supported by the $TiO_2$ powder. Then, a honeycomb catalyst 24 was prepared by the method similar to that described previously in conjunction with preparation of honeycomb catalyst 1.

Table 1 shows compositions of the crystalline silicate or carrier and the metals supported on the carriers in respect of the honeycomb catalysts 1 to 24 thus prepared:

TABLE 1

| Honeycomb catalyst No. | Active metal | Carrier No. | Composition of crystalline silicate or carrier |
|---|---|---|---|
| 1 | Pt | 1 | $0.5Na_2O.0.5H_2)[0.2Fe_2O_3.0.8Al_2O_3.0.2CaO]25SiO_2$ |
| 2 | Pt | 2 | $0.5Na_2O.0.5H_2)[0.2Co_2O_3.0.8Al_2O_3.0.2CaO]25SiO_2$ |
| 3 | Pt | 3 | $0.5Na_2O.0.5H_2)[0.2Ru_2O_3.0.8Al_2O_3.0.2CaO]25SiO_2$ |
| 4 | Pt | 4 | $0.5Na_2O.0.5H_2)[0.2Rh_2O_3.0.8Al_2O_3.0.2CaO]25SiO_2$ |
| 5 | Pt | 5 | $0.5Na_2O.0.5H_2)[0.2La_2O_3.0.8Al_2O_3.0.2CaO]25SiO_2$ |
| 6 | Pt | 6 | $0.5Na_2O.0.5H_2)[0.2Ce_2O_3.0.8Al_2O_3.0.2CaO]25SiO_2$ |
| 7 | Pt | 7 | $0.5Na_2O.0.5H_2)[0.2Ti_2O_3.0.8Al_2O_3.0.2CaO]25SiO_2$ |
| 8 | Pt | 8 | $0.5Na_2O.0.5H_2)[0.2V_2O_3.0.8Al_2O_3.0.2CaO]25SiO_2$ |
| 9 | Pt | 9 | $0.5Na_2O.0.5H_2)[0.2Cr_2O_3.0.8Al_2O_3.0.2CaO]25SiO_2$ |
| 10 | Pt | 10 | $0.5Na_2O.0.5H_2)[0.2Sb_2O_3.0.8Al_2O_3.0.2CaO]25SiO_2$ |
| 11 | Pt | 11 | $0.5Na_2O.0.5H_2)[0.2Ga_2O_3.0.8Al_2O_3.0.2CaO]25SiO_2$ |
| 12 | Pt | 12 | $0.5Na_2O.0.5H_2)[0.2Nb_2O_3.0.8Al_2O_3.0.2CaO]25SiO_2$ |
| 13 | Pt | 13 | $0.5Na_2O.0.5H_2)[0.2Fe_2O_3.0.8Al_2O_3.0.2MgO]25SiO_2$ |
| 14 | Pt | 14 | $0.5Na_2O.0.5H_2)[0.2Fe_2O_3.0.8Al_2O_3.0.2SrO]25SiO_2$ |
| 15 | Pt | 15 | $0.5Na_2O.0.05H_2)[0.2Fe_2O_3.0.8Al_2O_3.0.2BaO]25SiO_2$ |
| 16 | Pd | 1 | $0.5Na_2O.0.5H_2)[0.2Fe_2O_3.0.8Al_2O_3.0.2CaO]25SiO_2$ |
| 17 | Rh | 1 | $0.5Na_2O.0.5H_2)[0.2Fe_2O_3.0.8Al_2O_3.0.2CaO]25SiO_2$ |
| 18 | Ru | 1 | $0.5Na_2O.0.5H_2)[0.2Fe_2O_3.0.8Al_2O_3.0.2CaO]25SiO_2$ |
| 19 | Ir | 1 | $0.5Na_2O.0.5H_2)[0.2Fe_2O_3.0.8Al_2O_3.0.2CaO]25SiO_2$ |
| 20 | Pt | 16 | Y-type zeolite (molar ratio of $SiO_2$ to $Al_2O_3$ being 5.2) |

TABLE 1-continued

| Honeycomb catalyst No. | Active metal | Carrier No. | Composition of crystalline silicate or carrier |
|---|---|---|---|
| 21 | Pt | 17 | Mordenite (molar ratio of $SiO_2$ to $Al_2O_3$ being 10) |
| 22 | Pt | 18 | A-type zeolite (molar ratio of $SiO_2$ to $Al_2O_3$ being 0.5) |
| 23 | Pt | 19 | $\gamma$-$Al_2O_3$ |
| 24 | Pt | 20 | Anatase type $TiO_2$ |

TABLE 2

| Lattice spacing (d value) | Relative intensity |
|---|---|
| 11.2 ± 0.3 | VS |
| 10.0 ± 0.3 | VS |
| 6.7 ± 0.2 | W |
| 6.4 ± 0.2 | M |
| 6.0 ± 0.2 | M |
| 5.7 ± 0.2 | W |
| 5.6 ± 0.2 | M |
| 4.6 ± 0.1 | W |
| 4.25 ± 0.1 | M |
| 3.85 ± 0.1 | VS |
| 3.75 ± 0.1 | S |
| 3.65 ± 0.1 | S |
| 3.3 ± 0.1 | M |
| 3.05 ± 0.1 | W |
| 3.0 ± 0.1 | M |

VS: very strong
S: strong
M: medium
W: weak
X-ray source: CuK α

EXAMPLES 1 to 23

A single kind of honeycomb catalyst 1 for selective CO oxidation at a low temperature having an application temperature falling within a range of between 50° C. and 150° C. and another honeycomb catalyst 2 having an application temperature higher than the application temperature for the low temperature CO oxidation catalyst, said application temperature falling within a range of between 150° C. and 270° C., were selected from among the honeycomb catalysts 1 to 24. These CO selective oxidation catalyst 1 for high temperatures and CO selective oxidation catalyst 2 for low temperatures were arranged in series to form 23 kinds of a catalyst bed 3, as shown in the accompanying FIGURE. Tables 3 and 4 show the kinds of the honeycomb catalysts constituting each of these catalyst beds. Each of these CO selective oxidation catalysts 1 and 2 for high and low temperatures, respectively, was loaded in the catalyst bed in an amount of 15 cc, totaling 30 cc of the catalysts 1 and 2.

A sample gas containing 0.6% of CO, 24% of $CO_2$, 20% of $H_2O$, 0.6% of $O_2$ and 54.8% of $H_2$ and having a temperature of 70° C. was introduced into the catalyst bed 3 through the catalyst layer 1 of a high application temperature with GHSV (gas hourly space velocity) set at 10,000 $h^{-1}$ (gas amount of 300 NL/h) so as to remove carbon monoxide from the sample gas. During the test, the CO concentration at the outlet port of the catalyst bed 3 was continuously monitored by a ND-IR type CO meter and the CO concentration was measured when the CO concentration was stabilized. Tables 3 and 4 show the results. The particular CO removal test was conducted with the temperature of the sample gas changed to 100° C., 130° C., 160° C., 190° C., 220° C. and 270° C. The results are also shown in Tables 3 and 4.

COMPARATIVE EXAMPLES 1 to 5

One kind of a catalyst was selected from among the honeycomb catalysts 1 to 24 and the catalyst thus selected was used both as catalysts 1 and 2. The amount of each of these catalysts 1 and 2 was 15 cc, totaling 30 cc of catalysts 1 and 2. These catalysts 1 and 2 were arranged as shown in the FIGURE to form the catalyst bed 3. A sample gas having the composition equal to that of the sample gas used in Examples 1–23 and a temperature of 70° C. was introduced into the catalyst bed 3 through the catalyst layer 1 of a high application temperature with GHSV (gas hourly space velocity) set at 10,000 $h^{-1}$ (gas amount of 300 NL/h) so as to remove carbon monoxide from the sample gas. During the test, the CO concentration at the outlet port of the catalyst bed 3 was continuously monitored by a ND-IR type CO meter and the CO concentration was measured when the CO concentration was stabilized. Table 4 shows the results. The particular CO removal test was conducted with the temperature of the sample gas changed to 100° C., 130° C., 160° C., 190° C., 220° C. and 270° C. The results are also shown in Table 4.

TABLE 3

| | Honeycomb catalyst for high temperature (metal) | Honeycomb catalyst for low temperature (metal) | CO concentration at outlet of catalyst bed at various temperature of sample gas (ppm) | | | | | | |
|---|---|---|---|---|---|---|---|---|---|
| | | | 70° C. | 100° C. | 130° C. | 160° C. | 190° C. | 220° C. | 270° C. |
| Example 1 | 18 (Ru) | 1 (Pt) | 28 | 15 | 8 | 19 | 32 | 39 | 55 |
| Example 2 | 18 (Ru) | 2 (Pt) | 26 | 13 | 7 | 15 | 29 | 39 | 47 |
| Example 3 | 18 (Ru) | 3 (Pt) | 23 | 11 | 6 | 13 | 33 | 41 | 45 |
| Example 4 | 18 (Ru) | 4 (Pt) | 20 | 12 | 8 | 12 | 35 | 42 | 50 |
| Example 5 | 18 (Ru) | 5 (Pt) | 23 | 11 | 9 | 16 | 34 | 35 | 48 |
| Example 6 | 18 (Ru) | 6 (Pt) | 29 | 13 | 7 | 15 | 33 | 36 | 65 |
| Example 7 | 18 (Ru) | 7 (Pt) | 22 | 11 | 8 | 14 | 32 | 34 | 49 |
| Example 8 | 18 (Ru) | 8 (Pt) | 23 | 10 | 7 | 13 | 33 | 35 | 47 |

TABLE 3-continued

|  | Honeycomb catalyst for high temperature | Honeycomb catalyst for low temperature | CO concentration at outlet of catalyst bed at various temperature of sample gas (ppm) | | | | | | |
|---|---|---|---|---|---|---|---|---|---|
|  | (metal) | (metal) | 70° C. | 100° C. | 130° C. | 160° C. | 190° C. | 220° C. | 270° C. |
| Example 9 | 18 (Ru) | 9 (Pt) | 21 | 12 | 7 | 14 | 32 | 39 | 50 |
| Example 10 | 18 (Ru) | 10 (Pt) | 20 | 9 | 10 | 14 | 29 | 38 | 45 |
| Example 11 | 18 (Ru) | 11 (Pt) | 29 | 14 | 8 | 15 | 29 | 35 | 52 |
| Example 12 | 18 (Ru) | 12 (Pt) | 22 | 14 | 8 | 19 | 33 | 40 | 45 |
| Example 13 | 18 (Ru) | 13 (Ir) | 29 | 15 | 8 | 16 | 32 | 39 | 46 |
| Example 14 | 18 (Ru) | 14 (Ru) | 23 | 16 | 12 | 18 | 33 | 40 | 55 |

TABLE 4

|  | Honeycomb catalyst for high temperature | Honeycomb catalyst for low temperature | CO concentration at outlet of catalyst bed at various temperature of sample gas (ppm) | | | | | | |
|---|---|---|---|---|---|---|---|---|---|
|  | (metal) | (metal) | 70° C. | 100° C. | 130° C. | 160° C. | 190° C. | 220° C. | 270° C. |
| Example 15 | 18 (Ru) | 15 (Pt) | 22 | 14 | 13 | 19 | 38 | 41 | 48 |
| Example 16 | 16 (Rd) | 1 (Pt) | 25 | 16 | 14 | 28 | 34 | 42 | 120 |
| Example 17 | 17 (Rh) | 1 (Pt) | 24 | 25 | 19 | 15 | 25 | 100 | 130 |
| Example 18 | 19 (Ir) | 1 (Pt) | 45 | 29 | 13 | 10 | 20 | 54 | 72 |
| Example 19 | 18 (Ru) | 20 (Pt) | 76 | 46 | 34 | 20 | 37 | 45 | 53 |
| Example 20 | 18 (Ru) | 21 (Pt) | 69 | 50 | 25 | 23 | 34 | 44 | 56 |
| Example 21 | 18 (Ru) | 22 (Pt) | 70 | 45 | 23 | 20 | 34 | 42 | 51 |
| Example 22 | 18 (Ru) | 23 (Pt) | 69 | 50 | 19 | 21 | 33 | 45 | 55 |
| Example 23 | 18 (Ru) | 24 (Pt) | 70 | 30 | 12 | 10 | 18 | 36 | 50 |
| Comparative Exarnple 1 | 1 (Pt) | 1 (Pt) | 34 | 10 | 15 | 34 | 70 | 450 | 1800 |
| Comparative Example 2 | 21 (Pt) | 21 (Pt) | 55 | 42 | 22 | 33 | 100 | 560 | 3200 |
| Coinparative Example 3 | 22 (Pt) | 22 (Pt) | 70 | 55 | 30 | 23 | 160 | 1000 | 3300 |
| Comparative Example 4 | 19 (Ir) | 19 (Ir) | 380 | 220 | 130 | 130 | 120 | 80 | 60 |
| Comparative Example 5 | 18 (Ru) | 18 (Ru) | 3400 | 2200 | 1900 | 1700 | 140 | 45 | 41 |

As apparent from Tables 3 and 4, in Examples 1 to 23, in which two kinds of catalysts 1 and 2 differing from each other in the application temperature were arranged such that the catalyst layer 1 having a high application temperature was arranged on the upstream side and a sample gas containing $H_2$, $O_2$ and CO was passed through the catalyst bed 3 from the catalyst layer 1 having a high application temperature, it was possible to lower the CO concentration in the sample gas over a wide temperature range of 70 to 270° C. at the sample gas. However, in Comparative Examples 1 to 3, in which the catalyst layers 1 and 2 of the catalyst bed 3 were formed of the same catalyst having Pt supported as an active metal on the carrier, the CO concentration at the outlet of the catalyst bed 3 in the case where the temperature of the sample gas was 190 to 270° C. was found to be higher than in the case where the temperature of the sample gas was 70 to 160° C. On the other hand, in Comparative Examples 4 and 5, in which the catalyst layers 1 and 2 of the catalyst bed 3 were formed of the same catalyst having Ir or Ru supported as an active metal on the carrier, the CO concentration at the outlet of the catalyst bed 3 in the case where the temperature of the sample gas was 70 to 160° C. was found to be higher than in the case where the temperature of the sample gas was 190 to 270° C.

EXAMPLES 24 to 27

Three kinds of catalysts differing from each other in the application temperature were selected from among the honeycomb catalysts 1 to 24 and arranged in series in the order of the application temperature such that the honeycomb catalyst having a high application temperature was arranged on the upstream side so as to form the catalyst bed 3. The amount of each of these three catalysts was 15 cc, totaling 45 cc of the catalysts. Four different kinds of the catalyst bed were prepared.

A sample gas having the composition equal to that of the sample gas used in Examples 1–23 and having a temperature of 60° C. was introduced into the catalyst bed 3 through the catalyst layer of a high application temperature with GHSV (gas hourly space velocity) set at 10,000 $h^{-1}$ (gas amount of 450 NL/h) so as to remove carbon monoxide from the sample gas. During the test, the CO concentration at the outlet port of the catalyst bed 3 was continuously monitored by a ND-IR type CO meter and the CO concentration was measured when the CO concentration was stabilized. Table 5 shows the results. The particular CO removal test was conducted with the temperature of the sample gas changed to 120° C., 200° C. and 280° C. The results are also shown in Table 5.

TABLE 5

| | Honeycomb catalyst for high temperature (metal) | Honeycomb catalyst for intermediate temperature (metal) | Honeycomb catalyst for low temperature (metal) | CO concentration at outlet of catalyst bed at various temperature of sample gas (ppm) | | | |
|---|---|---|---|---|---|---|---|
| | | | | 60° C. | 120° C. | 200° C. | 280° C. |
| Example 24 | 18 (Ru) | 19 (Ir) | 1 (Pt) | 12 | 15 | 23 | 29 |
| Example 25 | 18 (Ru) | 19 (Ir) | 20 (Pt) | 42 | 48 | 34 | 25 |
| Example 26 | 18 (Ru) | 17 (Rh) | 1 (Pt) | 13 | 16 | 37 | 38 |
| Example 27 | 19 (Ir) | 17 (Rh) | 1 (Pt) | 14 | 19 | 45 | 80 |

As apparent from Table 5, in Examples 24 to 27, in which three kinds of catalysts differing from each other in the application temperature were arranged in series in the order of the application temperature such that the catalyst having a high application temperature was arranged on the upstream side so as to form the catalyst bed and a sample gas containing $H_2$, CO and an oxidizing gas of $O_2$ was passed through the catalyst bed from the catalyst layer having a high application temperature, the temperature range in which a high CO removal rate can be obtained can be widened to 60 to 280° C., compared with the range of between 70° C. and 270° C. for Examples 1 to 23.

In the Examples described above, the crystalline silicate carrier of the catalyst capable of selectively oxidizing carbon monoxide was of H-type. However, it has also been confirmed that it is possible to obtain the similar effects in the case of using a catalyst capable of selectively oxidizing carbon monoxide, said catalyst having a crystalline silicate carrier represented by formula (1) in a dehydrated state in which R represents an alkali metal or a composition of an alkali metal and proton.

Also, in the Examples described above, the catalyst bed was prepared by arranging in series two or three kinds of catalysts capable of selectively oxidizing carbon monoxide. If four or more kinds catalysts are arranged in series to form a catalyst bed, the carbon monoxide removal rate can be further increased, and the temperature range in which a high carbon monoxide removal rate can be obtained can be further widened.

As described above in detail, the present invention provides a method of selectively removing carbon monoxide from a gaseous mixture containing $H_2$ and CO, which permits a high carbon monoxide removal rate over a wide temperature range.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of selectively removing carbon monoxide, comprising:

preparing a catalyst bed capable of selectively oxidizing carbon monoxide and including a plurality of catalyst layers arranged in series and said plurality of catalyst layers differing from each other in the temperature of application and arranged in the order of the application temperature such that the catalyst layer having the highest application temperature constitutes the upstream side of the catalyst bed; and introducing a gaseous mixture containing $H_2$, CO and an oxidizing agent of $O_2$ into said catalyst bed through the upstream side of the catalyst bed so as to selectively oxidize and remove CO from the gaseous mixture;

wherein said plurality of catalyst layers comprises:

a first catalyst layer comprising a carrier and Pt as an active metal and supported on said carrier; and a second catalyst layer comprising a carrier and Ir supported on said carrier.

2. The method of selectively removing carbon monoxide according to claim 1, wherein said carrier of said first and second catalyst layers is selected from the group consisting of Y-zeolite, mordenite, A-zeolite, $\gamma$-$Al_2O_3$, anatase and a crystalline silicate having the highest to the fifth highest peaks in the powder X-ray diffraction using CuK$\alpha$ ray in the lattice spacing of 3.65±0.1 Å, 3.75±0.1 Å, 3.85±0.1 Å, 10.0±0.3 Å, and 11.2±0.3 Å, respectively, said crystalline silicate having the composition represented by formula (1) under a dehydrated state:

$$(1\pm0.8)R_2O.(aM_2O_3.bNO.cAl_2O_3).ySiO_2 \qquad (1)$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are:

$0 \leq a$, $0 \leq b \leq 20$, $a+c=1$, and $11 \leq y \leq 3000$.

3. The method of selectively removing carbon monoxide according to claim 1, wherein the temperature of said gaseous mixture falls within a range of between 50° C. and 280° C. when said gaseous mixture is introduced into said catalyst bed.

4. The method of selectively removing carbon monoxide according to claim 1, wherein the CO concentration of said gaseous mixture is not higher than 4%.

5. The method of selectively removing carbon monoxide according to claim 1, wherein said first catalyst layer is provided on a most downstream side of said catalyst bed.

6. The method of selectively removing carbon monoxide according to claim 1, wherein said first catalyst layer and said second catalyst layer are arranged in the order of said second catalyst layer and said first catalyst layer from an upstream side of said catalyst bed.

7. The method of selectively removing carbon monoxide according to claim 1, wherein said catalyst bed further comprises a third second catalyst layer comprising a carrier and Ir supported on said carrier;

wherein said third catalyst layer is upstream of said second catalyst layer; and wherein said second catalyst layer is upstream of said first catalyst layer.

8. A method of selectively removing carbon monoxide, comprising:

preparing a catalyst bed capable of selectively oxidizing carbon monoxide and including a plurality of catalyst layers arranged in series and said plurality of catalyst layers differing from each other in the temperature of application and arranged in the order of the application temperature such that the catalyst layer having the highest application temperature constitutes the upstream side of the catalyst bed; and introducing a gaseous mixture containing $H_2$, CO and an oxidizing agent of $O_2$ into said catalyst bed through the upstream side of the catalyst bed so as to selectively oxidize and remove CO from the gaseous mixture;

wherein at least one of the catalyst layers comprises a carrier and an active metal supported on said carrier, said carrier being a crystalline silicate having the highest to fifth highest peaks in the powder X-ray diffraction using CuKα ray in the lattice spacing of 3.65±0.1 Å, 3.75±0.1 Å, 3.85±0.1 Å, 10.0±0.3 Å, and 11.2±0.3 Å, respectively, said crystalline silicate having the composition represented by formula (1) under a dehydrated state:

$$(1\pm0.8)R_2O \cdot (aM_2O_3 \cdot bNO \cdot cAl_2O_3) \cdot ySiO_2 \qquad (1)$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are: $0 \leq a$, $0 \leq b \leq 20$, $a+c=1$, and $11 \leq y \leq 3000$.

9. The method of selectively removing carbon monoxide according to claim 8, wherein said crystalline silicate exhibits the highest to the eleventh highest peaks in a powder X-ray diffraction using a CuK α ray in the lattice spacing of 3.0±0.1 Å, 3.3±0.1 Å, 3.65±0.1 Å, 3.75±0.1 Å, 3.85±0.1 Å, 4.25±0.1 Å, 5.6±0.2 Å, 6.0±0.2 Å, 6.4±0.2 Å, 10.0±0.3 Å, and 11.2±0.3 Å, respectively.

10. The method of selectively removing carbon monoxide according to claim 8, wherein said crystalline silicate exhibits the highest to the fifteenth highest peaks in a powder X-ray diffraction using a CuK α ray in the lattice spacing of 3.0±0.1 Å, 3.05±0.1 Å, 3.3±0.1 Å, 3.65±0.1 Å, 3.75±0.1 Å, 3.85±0.1 Å, 4.25±0.1 Å, 4.6±0.1 Å, 5.6±0.2 Å, 5.7±0.2 Å, 6.0±0.2 Å, 6.4±0.2 Å, 6.7±0.2 Å, 10.0±0.3 Å, and 11.2±0.3 Å, respectively.

11. The method of selectively removing carbon monoxide according to claim 8, wherein said active metal comprises at least one metal selected from the group consisting of Pt, Pd, Ru, Rh and Ir.

12. The method of selectively removing carbon monoxide according to claim 8, wherein the temperature of said gaseous mixture falls within a range of between 50° C. and 280° C. when said gaseous mixture is introduced into said catalyst bed.

13. The method of selectively removing carbon monoxide according to claim 8, wherein the CO concentration of said gaseous mixture is not higher than 4%.

14. A method of selectively removing carbon monoxide comprising:

preparing a catalyst bed capable of selectively removing carbon monoxide and including a plurality of catalyst layers arranged in series and said plurality of catalyst layers differing from each other in the temperature of application and arranged in the order of the application temperature such that the catalyst layer having the highest application temperature constitutes the upstream side of the catalyst bed; and introducing a gaseous mixture containing $H_2$, CO and an removing agent of $O_2$ into said catalyst bed through the upstream side of the catalyst bed so as to selectively oxidize and remove CO from the gaseous mixture, said plurality of catalyst layers comprising:

a first catalyst layer having a high application temperature comprising a carrier and at least one active metal selected from the group consisting of Pd, Ru, Rh and Ir supported by said carrier;

a second catalyst layer having a low application temperature comprising a carrier and Pt supported by said carrier; and a third catalyst layer having an intermediate application temperature, arranged between said first and second catalyst layers, said third catalyst layer comprising a carrier and at least one active metal selected from the group consisting of Pd, Ru, Rh and Ir supported by said carrier.

15. The method of selectively removing carbon monoxide according to claim 14, wherein said carrier in each of said first, second and third catalyst layers is independently selected from the group consisting of Y-zeolite, mordenite, A-zeolite, γ-$Al_2O_3$, anatase and a crystalline silicate having the highest to fifth highest peaks in the powder X-ray diffraction using CuKα ray in the lattice spacing of 3.65±0.1 Å, 3.75±0.1 Å, 3.85±0.1 Å, 10.0±0.3 Å, and 11.2±0.3 Å, respectively, said crystalline silicate having the composition represented by formula (1) under a dehydrated state:

$$(1\pm0.8)R_2O \cdot (aM_2O_3 \cdot bNO \cdot cAl_2O_3) \cdot ySiO_2 \qquad (1)$$

where R denotes at least one element selected from the group consisting of an alkali metal and H, M denotes at least one element selected from the group consisting of VIII group elements, rare earth elements, Ti, V, Cr, Nb, Sb and Ga, N denotes at least one element selected from the group consisting of Mg, Ca, Sr, and Ba, and the molar ratios a, b, c and y are: $0 \leq a$, $0 \leq b \leq 20$, $a+c=1$, and $11 \leq y \leq 3000$.

* * * * *